(12) United States Patent
Garaud et al.

(10) Patent No.: US 9,096,721 B2
(45) Date of Patent: Aug. 4, 2015

(54) FILM FORMING, SILICONE CONTAINING COMPOSITIONS

(75) Inventors: Jean-Luc Garaud, Comines (FR); Guillaume Kergosien, Chaville (FR); Xavier Thomas, Famars (FR)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/379,893

(22) PCT Filed: Jul. 2, 2010

(86) PCT No.: PCT/US2010/040878
§ 371 (c)(1),
(2), (4) Date: Dec. 21, 2011

(87) PCT Pub. No.: WO2011/003054
PCT Pub. Date: Jan. 6, 2011

(65) Prior Publication Data
US 2012/0095109 A1    Apr. 19, 2012

(30) Foreign Application Priority Data

Jul. 3, 2009   (EP) ..................................... 09305644

(51) Int. Cl.
| | | |
|---|---|---|
| A61K 47/34 | (2006.01) |
| C08G 77/12 | (2006.01) |
| C08L 83/04 | (2006.01) |
| C09D 183/04 | (2006.01) |
| C08G 77/20 | (2006.01) |
| C08G 77/00 | (2006.01) |

(52) U.S. Cl.
CPC ................ C08G 77/12 (2013.01); C08L 83/04 (2013.01); C09D 183/04 (2013.01); *C08G 77/20* (2013.01); *C08G 77/70* (2013.01); *C08G 77/80* (2013.01)

(58) Field of Classification Search
None
See application file for complete search history.

(56) References Cited

U.S. PATENT DOCUMENTS

| | | | |
|---|---|---|---|
| 2,676,182 | A | 4/1954 | Daudt et al. |
| 2,857,356 | A | 10/1958 | Goodwin, Jr. |
| 3,936,582 | A | 2/1976 | Keiser |
| 4,026,845 | A | 5/1977 | Kim et al. |
| 4,550,125 | A | 10/1985 | Lee et al. |
| 6,423,322 | B1 | 7/2002 | Fry |
| 2002/0102295 | A1* | 8/2002 | Niemiec et al. ............... 424/450 |
| 2003/0190301 | A1 | 10/2003 | Fry |
| 2003/0214051 | A1 | 11/2003 | Dent et al. |
| 2004/0039132 | A1* | 2/2004 | Ferritto et al. ................. 525/393 |
| 2007/0148475 | A1 | 6/2007 | Sherman et al. |
| 2008/0279797 | A1 | 11/2008 | Maitra et al. |
| 2009/0214455 | A1 | 8/2009 | Blin et al. |

FOREIGN PATENT DOCUMENTS

| | | |
|---|---|---|
| DE | 10316305 B4 | 2/2007 |
| EP | 0322118 | 6/1989 |
| EP | 465744 | 11/1994 |
| EP | 0865787 | 8/2002 |
| EP | 1057476 | 3/2003 |
| EP | 1481660 | 2/2008 |
| JP | 08134427 | 5/1996 |
| JP | 2003292415 | 10/2003 |
| WO | 0074738 | 12/2000 |
| WO | 0196450 | 12/2001 |
| WO | 02089760 | 11/2002 |
| WO | 2004091562 | 10/2004 |
| WO | 2004108175 | 12/2004 |
| WO | 2004110393 | 12/2004 |
| WO | 2005102403 | 11/2005 |
| WO | 2007071706 A9 | 6/2007 |
| WO | 2008057155 | 5/2008 |
| WO | 2008074844 | 6/2008 |
| WO | 2008074846 | 6/2008 |
| WO | 2008074850 | 6/2008 |
| WO | 2008074859 | 6/2008 |
| WO | 2008074870 | 6/2008 |
| WO | 2008075281 | 6/2008 |
| WO | 2008075282 | 6/2008 |
| WO | 2008075283 | 6/2008 |
| WO | 2008075300 | 6/2008 |
| WO | 2008075301 | 6/2008 |

* cited by examiner

*Primary Examiner* — Michael B Pallay
(74) *Attorney, Agent, or Firm* — Timothy J. Troy

(57) ABSTRACT

The invention relates to silicone containing compositions able to form adhesive films on substrates, which typically comprises a curable silicone composition comprising components (a), (d) and at least one of (b) or (c): a. a polyorganosiloxane resin, composed of M and Q units having at least 3 alkenyl groups per molecule, herein after called "SiVi" groups, b. a polyorganosiloxane compound having at least 2 Si-bonded hydrogen groups on the polysiloxane chain, hereinafter called "SiH" groups, c. a telechelic polyorganosiloxane compound having terminal Si—H groups, and d. a hydrosilylation catalyst for the reaction of SiH groups with SiVi groups, e. a liquid diluent in an amount of from 0% to maximum 40% by weight of composition said components reacting together by hydrosilylation at a temperature below 400 C when they are brought into contact on a substrate and cure to form a continuous film on the substrate. Such formulation can cure quickly at room temperature and can provide good balance between adhesion and tack.

18 Claims, No Drawings

FILM FORMING, SILICONE CONTAINING COMPOSITIONS

CROSS REFERENCE TO RELATED APPLICATIONS

This application is a U.S. national stage filing under 35 U.S.C. §371 of PCT Application No. PCT/US10/40878 filed on 02/July/2010, currently pending, which claims the benefit of EP Patent Application No. 09305644.8 filed 03/July/2009 under 35 U.S.C. §119 (e). PCT Application No. PCT/US10/40878 and EP Patent Application No. 09305644.8 are hereby incorporated by reference.

INTRODUCTION

This invention relates to silicone containing compositions able to be applied on substrates, especially on biological substrates, which can be vegetal or animal, for example human skin or vegetal crust.

Film forming, silicone containing compositions can be useful in the fields of cosmetics, pharmaceutical and medical applications.

A system comprising silicone compounds permits to obtain cosmetic or medical compositions, which may exhibit one or more advantageous properties such as good transfer resistance, staying power over time in particular resistance to water and rubbing, a comfortable deposit on the skin and good biocompatibility of the silicone with the skin.

A cosmetic product, as defined under Article 1 of the European Directive 76/768/EEC dated 27 Jul. 1976, means any substance or preparation intended to be placed in contact with the various external parts of the human body (epidermis, hair system, nails, lips and external genital organs) or with the teeth and the mucous membranes of the oral cavity with a view exclusively or mainly to cleaning them, perfuming them, changing their appearance and/or correcting body odours and/or protecting them or keeping them in good condition.

Delimiting the field of pharmaceuticals from cosmetics not only follows from the detailed definition of cosmetic products, which refers to both their areas of application and to the purposes of their use: some products may fall under the definition of cosmetic product but are exclusively intended to protect from diseases and integrity alteration, and to restore integrity, such products are then regulated products such as pharmaceutical products or medical devices and, moreover, products containing substances or preparations intended to be ingested, inhaled, injected or implanted in the human body do not come under the field of cosmetics. Products such as skin barrier, bandage, gauze or wound dressing products also come under the pharmaceutical area.

A pharmaceutical or medical product typically contains a therapeutic active agent X having a pharmaceutical or medical action whereas the vehicle Y may be similar to the one of a cosmetics product.

Many compositions for the topical delivery of pharmaceuticals are known in the art. These include, for example, mucosal dosage forms, transdermal delivery systems, dermatological and subcutaneous therapeutic treatments, medicated wound dressings and the like.

Some of the known drug delivery compositions use silicone based materials as matrices or membranes through which pharmaceutical agents are able to diffuse onto and into the body to deliver locally or systemically the therapeutic effect. Silicone based materials are desirable in these compositions since they are able to form breathing films onto the body and allow for sustained or controlled release of actives.

Many formulations for forming films are known for cosmetics and in medical, and pharmaceutical art. These include, for example, ointments, salves, creams, lotions, gels, elastomers and the like.

For example, EP1057476 describes a stable, creamy gel composition suitable for use in cosmetics. The gel is prepared starting from a mixture comprising 60%-90% low viscosity organopolysiloxane, from 5% to 15% vinyl-functional MQ resin and from 1% to 8% Si—H functional poly(methylhydrogen) (dimethyl)siloxane bearing Si—H functionality along the polysiloxane backbone, said hydrosilylation being promoted by an effective amount of a hydrosilylation catalyst. The mixture is heated to a temperature between 70° C. and 130° C. for 2 to 5 hours to effect curing. The gel obtained is then sheared to form a creamy gel resistant to separation.

EP 465744 describes a sustained release formulation comprising an agent (A) which is to be released and a vehicle (B) therefore. The vehicle comprises a hydrophilic component and a curable silicone composition containing a polysiloxane having alkyhydrogen units, a polysiloxane having unsaturated groups and a platinum or rhodium catalyst. The formulation may be applied to the human or animal body or a cavity in the latter to cure in situ to give a dressing capable of sustained release of the therapeutic or diagnostic agent (A) to the body.

EP 0865787 describes another silicone based material suitable for in situ applications e.g. on a human or animal body. EP 0865787 describes a method of making a controlled release composition comprising preparing a sprayable formulation and spraying the sprayable formulation onto the desired site, wherein said spraying causes mixing of the sprayable formulation and wherein said mixed sprayable formulation cures in situ on the desired site to form the controlled release composition.

WO2008/057155 describes "silicone gel forming compositions that have an average RHAlk of 0.7 to 1.5, typically 0.8 to 0.95 and with an average RHCE of 0.4 to 1, typically 0.8 to 0.95 and the silicone gels produced by curing the gel forming composition. These gels are suitable for temporarily adhering a medical device to a biological substrate such as skin".

WO2008074844 relates to a cosmetic kit comprising at least two separately-packaged cosmetic compositions,—the kit comprising at least one silicone compound X, at least one silicone compound Y and, optionally, at least one catalyst,—with the proviso that the compounds X and Y—and the catalyst when present—are not simultaneously in one of said compositions,—said compounds X and Y being able to react together by a hydrosilylation reaction when the catalyst is present or by condensation reaction, when they are brought into contact with one another,—one at least of the first and second compositions comprising at least one glossy oil,—said compounds X and Y and said glossy oil, and their respective amounts, being such that the average gloss of the deposit comprising the two compositions is greater than or equal to 60 out of 100.

It is still desired to provide improved methods for formulating in situ film forming compositions which combine a fast cure, a good adhesion to substrate, a low tack surface and suitable compatibility with pharmaceutical or cosmetic products.

It is desired that formulations for use in cosmetic or medical applications, and in general for use on living bodies are able to cure in situ at low temperature such as at room temperature for example between 20° C. and 30° C., and/or at the temperature of the living body, for example between 30° C. and 40° C. cure and that this cure is fast for example less than 10 minutes.

In one of its aspects, the present invention relates to a method of making topical active delivery compositions and to the use of silicone based formulations that rapidly solidify for forming films onto skin, mucosa or wound tissue to deliver pharmaceutical active molecules.

BRIEF DESCRIPTION OF THE INVENTION

We have now discovered that silicone containing formulations with certain amounts of components are able to meet the objectives of combining fast cure, good adhesion and low tack.

We have also discovered a more suitable method of making a controlled release composition which can form in situ a non-tacky and elastic film with improved adhesion.

In one of its aspects, the invention provides a composition comprising a curable silicone formulation containing: components (a), (d) and at least one of (b) or (c):
a. a polyorganosiloxane resin, composed of M and Q units having at least 3 alkenyl groups per molecule, herein after called "SiVi" groups,
b. a polyorganosiloxane compound having at least 2 Si-bonded hydrogen groups on the polysiloxane chain, hereinafter called "SiH" groups,
c. a telechelic polyorganosiloxane compound having terminal Si—H groups, and
d. a hydrosilylation catalyst for the reaction of SiH groups with SiVi groups,
e. a liquid diluent in an amount of from 0% to maximum 40% by weight of the composition
said components reacting together by hydrosilylation at a temperature below 40° C. when they are brought into contact on a substrate and cure to form a continuous film on the substrate.

A formulation meeting these requirements is able to cure quickly at room temperature/ambient as a film on a substrate and can provide good balance between adhesion and tackiness requirements; the film can show good adhesion to the substrate while the surface opposite to the substrate shows low tack.

The present invention provides in one of its aspects a controlled release composition for medical or pharmaceutical use comprising a spreadable formulation containing an active agent X and a vehicle Y, said vehicle comprising a curable silicone formulation containing components (a), (d) and at least one of (b) or (c):
a. a polyorganosiloxane resin, composed of M and Q units having at least 3 alkenyl groups per molecule, herein after called "SiVi" groups,
b. a polyorganosiloxane compound having at least 2 Si-bonded hydrogen groups on the polysiloxane chain, hereinafter called "SiH" groups,
c. a telechelic polyorganosiloxane compound having terminal Si—H groups, and
d. a hydrosilylation catalyst for the reaction of SiH groups with SiVi groups,
e. a liquid diluent in an amount of from 0% to maximum 40% by weight of the composition
said components reacting together by hydrosilylation at a temperature below 40° C. when they are brought into contact on a substrate and cure to form a continuous film on the substrate.

Component (a) is a polydiorganosiloxane resin having at least 3 silicon-bonded alkenyl groups per molecule, with preferably the remaining silicon-bonded organic groups being selected from alkyl and aryl groups, said polydiorganosiloxane resin preferably has a molecular weight from 1,500 daltons to 50,000 daltons.

The SiH containing compound (b) or (c) is a hydrosilicon compound having at least 2 silicon-bonded hydrogen atoms per molecule, which preferably consists essentially of RHSiO— groups, R2ZSiO— groups and optionally R2SiO— groups and preferably has a viscosity at 25° C. of no more than 1,000 mm$^2$/s, wherein R denotes an alkyl or aryl group having no more than 8 carbon atoms, and Z denotes H or R.

The composition can contain a further compound having SiVi groups, especially an alkenyl-terminated polydiorganosiloxane, when the hydrosilicon compound has at least 3 silicon-bonded hydrogen atoms per molecule, wherein preferably the organic substituents are alkyl or aryl groups having no more than 8 carbon atoms, and having a viscosity at 25° C. from 1 to 150,000 mm$^2$/s.

Preferably a large amount of the SiVi groups in the composition comes from the MQ resin. Therefore, preferably, $RVi_R > 0.3$, more preferably $> 0.9$ wherein $RVi_R$ is the ratio of the number of vinyl moles in the vinyl MQ resin with respect to the total number of vinyl moles in the composition.

It may be noted that $RVi_R$ cannot be equal to 0 as this would imply the absence of MQ resin which is an essential component of the composition according to the present invention.

DETAILED DESCRIPTION OF THE INVENTION

The component materials of vehicle Y can either be separated into a plurality of containers to inhibit curing prior to spreading or can be packaged into a unique container wherein the hydrosilylation catalyst (d) is temporarily inhibited, wherein the temporary inhibition is obtained by encapsulating the hydrosilylation catalyst (d) or by adding transient inhibitors.

The formulation of the invention can be applied by spreading the formulation onto the desired site, wherein said spreading can cause mixing the formulation or the mixing of the formulation is achieved prior spreading the formulation.

The activation of the catalyst can occur prior to spreading the formulation, or can be caused by spreading the formulation, or can be caused by mixing the formulation, or can occur after spreading the formulation.

After spreading, the formulation cures in situ on the desired site to form the sustained release composition. The resultant sustained release composition is then capable of delivering a pharmaceutical or biological active X at a controlled rate.

The active agent X used in the present invention can comprise any solid or liquid material which can be bound in the sustained release composition and subsequently released at the desired rate. The active agent X should also not interfere with the curing of the silicone formulation to an unacceptable extent. Suitable active agents X include cosmetics and therapeutic or diagnostic materials.

The invention is especially applicable to those therapeutic and diagnostic active agents X which benefit from topical delivery over a period of time at a sustained rate. For example, it is known that for certain drugs it is desirable to have the quantity of drug in the animal body continuously remaining within a therapeutic window. By tailoring a formulation according to the invention, it is possible to provide sustained release compositions which deliver the drugs at rates which keep their concentrations in the body within their therapeutic windows.

Therapeutic active agents X which may be employed include, for example, anti acne agent, antibiotic, antiseptic, antifungal, antibacterial, antimicrobial, biocides, anti-inflammatory, astringents, hormones, anticancer agents, smoking cessation compositions, cardiovascular drugs, histamine blocker, bronchodilator, analgesic, antiarrythmic, antihistamine, alpha blockers, beta blockers, ACE inhibitor, diuretic, antiaggregant, sedative, tranquillizer, anticonvulsant, anticoagulant agents, vitamins, antiaging agents, agents for treating gastric and duodenal ulcers, anticellulites, proteolytic enzymes, healing factors, cell growth nutrients, peptides and others, and their derivatives.

Specific examples of suitable therapeutic active agents X include penicillins, cephalosporins, tetracyclines, macrolides, epinephrines, amphetamines, aspirin, acetaminophen, barbiturates, catecholamines, benzodiazepine, thiopental, codeine, morphine, procaine, lidocaine, benzocaine, sulphonamides, ticonazole, perbuterol, furosamide, prazosin, prostaglandins, salbutamol, indomethicane, diclofenac, glafenine, dipyridamole, theophylline, retinol; and their derivatives.

In addition to the therapeutic or diagnostic materials, active agents X could be cosmetics such as perfumes, deodorants, pigments, anti-perspirant compounds, waxes, gelling agent or another silicone compound able to provide a soft and silky touch, or the like. Suitable cosmetics are known to those skilled in the art.

The proportion of the active agent X employed in the present invention is chosen in accordance with the concentration of the active agent X required in the sustained release composition to deliver the dosage required at the proposed delivery rate. This may vary within a wide range such as from 0.001 weight percent to about 70 weight percent, preferably 0.01 weight percent to 20 weight percent of the final sustained release composition.

The vehicle Y used in the present invention comprises silicones ('polysiloxanes') or silicone-based materials which cure to form binder matrices for the other components (e.g. the active agent X of the invention (i.e., they contain or entrap such components).

The polysiloxanes used herein comprise those which have silicon-bonded hydrogen atoms (b), in combination with those that have silicon-bonded unsaturated hydrocarbon groups (c) and the polyorganosiloxane resins having silicon-bonded unsaturated hydrocarbon groups (a). These polysiloxanes undergo a hydrosilylation reaction in the presence of a catalyst (d) to yield chain extended or cross-linked elastomeric silicone films.

Suitable polysiloxanes (b) having silicon bonded hydrogen (e.g. Si—H) include those having units according to the general formula RpHSiO(3-p/2) wherein R denotes an alkyl or aryl group having no more than 8 carbon atoms, such as alkyl (e.g., methyl, ethyl, propyl or butyl) or phenyl groups and p is 0, 1, or 2. It is preferred that each R represents a methyl group. It is also preferred that the terminal groups have the formula R3SiO½ where each R represents a methyl group.

The polysiloxanes (b) having silicon bonded hydrogen may include those forming cyclics, for example tetramethylcyclotetrasiloxane (D4H) or pentamethylcyclopentasiloxane (D5H).

The polysiloxanes (b) having silicon bonded hydrogen atoms may alternatively be copolymers comprising, for example R2SiO and HRSiO, and in which the terminal groups have the formula R3SiO½ or HR2SiO½ in which R is as referred to above.

The polysiloxanes (b) having silicon bonded hydrogen may alternatively include the mixtures of polysiloxanes as described above and can also be used herein.

Preferably the polysiloxane (b) having silicon bonded hydrogen atoms has from 0.0001 mol/g to 5 mol/g hydrogen atoms based on the weight of the polymer and a viscosity of from about 0.1 mm²/s to about 1,000 mm²/s at 25° C.

Suitable polysiloxanes (c) terminated with silicon bonded hydrogen atoms include those having units according to the general formula HR2SiO$_{2/2}$ in which each R represents a monovalent hydrocarbon group containing 1 to 8 carbon atoms, such as alkyl (e.g., methyl, ethyl, propyl or butyl) or phenyl groups. It is preferred that each R represents a methyl group.

Preferably the polysiloxane (c) terminated with silicon bonded hydrogen atoms has from 0.00001 mol/g to 2 mol/g hydrogen atoms based on the weight of the polysiloxane.

Suitable polysiloxanes (c) having silicon bonded hydrogen atoms include those having viscosities on the order of from about 0.1 mm²/s to about 150,000 mm²/s at 25° C.

Preferably, the SiH groups containing compound is mainly formed of telechelic polyorganosiloxane compound (c) having terminal Si—H groups. Preferably, no component (b) is present.

Preferably, the liquid diluent is present in an amount of less than 30%, more preferably less than 25% by weight of the composition.

Preferably, the MQ resin is present in an amount comprised between 30% and 60% by weight of the composition.

Preferably, the SiH groups containing components are present in an amount comprised between 5% and 30% by weight of the composition.

Suitable polyorganosiloxane resins having silicon bonded unsaturated groups (a) are those with sufficient unsaturated groups for formation of the polymer network. The functional siloxane resin structure may comprise R$_3$SiO$_{1/2}$ units (M units) and SiO$_{4/2}$ units (Q units) wherein each R is independently a linear, branched or cyclic hydrocarbon group having 1-20 carbon atoms. Each R can be identical or different, as desired. The hydrocarbon group of R can be exemplified by alkyl groups such as methyl, ethyl, propyl, butyl, hexyl, octyl, vinyl, hexenyl and aryl groups such as phenyl.

The functional siloxane resin structure may comprise some RSiO$_{3/2}$ units (also known as T units) in which the groups R, which can be different in different siloxane units, are selected from hydroxyl, hydrocarbon, substituted hydrocarbon, hydrocarbonoxy and substituted hydrocarbonoxy groups.

Resins comprising R$_3$SiO$_{1/2}$ units and SiO$_{4/2}$ units are well known in the art. These copolymers are described, for example, in U.S. Pat. Nos. 3,936,582, 2,676,182, and 2,857,356. The resinous copolymers can be prepared by cohydrolysis of a mixture of silanes having four hydrolyzable groups, e.g., silicon tetrachloride, and triorganosilanes having one hydrolyzable group, e.g., trimethylchlorosilane, in the proper ratio. A specific method for the preparation of these resinous copolymers is described in U.S. Pat. No. 2,676,182, wherein a silica hydrosol is reacted under acidic conditions with a source of triorganosiloxy units such as a hexaorganodisiloxane, for example, hexamethyldisiloxane, or a hydrolyzable triorganosilane, for example, trimethylchlorosilane, or mixtures thereof.

Preferably, the polyorganosiloxane resins having silicon bonded unsaturated groups have from 0.00001 mol/g as vinyl group based on the weight of the polymer to 0.1 mol/g as vinyl group based on the weight of the polymer.

The catalysts (d) used in the present invention comprise those known in the art to facilitate the hydrosilylation reaction. These include, for example, platinum and rhodium materials. These catalysts may take any of the known forms such as platinum or rhodium deposited on carriers such as silica gel or powdered charcoal or other appropriate compounds such as platinic chloride, salts of platinum and chloroplatinic acids, chloroplatinic acid either as the commonly obtainable hexahydrate or the anhydrous form because of its easy dispersibility in organosilicon systems and its non-effect on colour of the mixture. Platinum or rhodium complexes may also be used e.g. those prepared from chloroplatinic acid hexahydrate and divinyltetramethyldisiloxane. A preferred material is the platinum complex stabilized by divinyltetramethyldisiloxane.

When the polysiloxanes and the catalyst of the invention are mixed, they cure at room temperature (20±5° C.) within 10 minutes or, more preferably, within five minutes or less. Higher temperature, such as skin temperature, which is around 32° C., is beneficial as it can decrease the cure time. In order to achieve satisfactory cure it is important that RHV the ratio of silicon-bonded hydrogen atoms of the polysiloxanes to all groups reactive therewith in the formulation (e.g., the unsaturated groups) is appropriate to affect the desired cure. The curing time is dependent on various factors including the type and proportion of other component materials present in the formulation. Working with low or intermediate viscosity materials (<10,000 mm2/s), having a RHV>1.5 and a Pt level between 10 ppm and 200 ppm are factors that allow for that short curing time.

The proportion of cured binder matrix derived from vehicle Y in the controlled release composition may vary widely depending on the intended site of application and the use of the composition. For example, the controlled release compositions may contain from 30% to 99.99% by weight of such cured binder matrix.

The final sustained release composition can be in the form of a gel or an elastomer and it can have pores (e.g., foams) or it can be pore-free.

If it is desired to prolong the cure time, one may include in the formulation one of the known catalyst inhibitors such as cyclic polymethylvinylsiloxane compounds or an acetylenic alcohol e.g. methyl butynol but these are not generally preferred in a formulation according to the invention.

If foaming of the formulation is desired, it may be induced by, for example, including a polysiloxane having silicon-bonded hydroxyl groups which reacts with the polysiloxane having silicon-bonded hydrogen atoms as more fully described, for example, in U.S. Pat. No. 4,026,845.

Alternatively aliphatic alcohol (for example a primary aliphatic or aralphatic alcohol such as a lower aliphatic monofunctional alcohol having up to 12 carbon atoms (e.g. ethanol, n-propanol, or benzyl alcohol), a silanol or a volatile blowing material can be included in the formulation as more fully described, for example, in U.S. Pat. No. 4,550,125.

Preferred foamable formulations include compounds having silicon-bonded or carbon bonded hydroxyl groups which foam and cure in presence of a platinum catalyst according to the patent EP 0 865 787.

The formulation of the invention can be complemented with selected additives to deliver targeted performances without adversely affecting any of the component materials of the formulation or the curing time.

For example the additive can be a compound helping to adjust the rheology behaviour of the formulation or compatibilize the various components of the formulation. The compound can be a liquid material, sometimes called a diluent, or another material, like a gel or a dispersion of solid particles. The compound which may be employed includes volatile and non volatile fluids such as silicone volatiles, silicone fluids, hydrocarbons, alcohols, ketones, esters and any other liquid material. Examples of liquid compounds include hexamethyldisiloxane, octamethyltrisiloxane, and other linear siloxanes, cyclic siloxanes such as octamethylcyclotetrasiloxane, decamethylcyclopentasiloxane and dodecamethylcyclohexasiloxane. Examples also include isododecane, isohexadecane, ethylacetate, ethyl alcohol, isopropyl alcohol, ester palmitate, propylene glycol, C12-15 alkyl benzoate, caprylic/capric triglyceride, coco-caprylate/caprate, diisopropyl adipate, diisostearyl fumarate, diisostearyl malate, isocetyl stearate, isopropyl isostearate, isopropyl laurate, isopropyl myristate, isopropyl palmitate, isopropyl stearate, isostearyl benzoate, myristyl ether acetate w/propylene glycol, myristyl lactate, octyldodecyl stearoyal stearate, octylpalmitate, octylstearate, tridecyl neopentanoate, triisocetyl citrate, lauryl alcohol, oleyl alcohol, glyceryl trioctanate, polyglyceryl-3 diisostearate, mineral oil, dipropylene glycol, glycol ether, glycerin, castor oil, lanolin oil, sunflower oil, isododecane, C11-12 isoparaffin, polydecene and their derivatives.

The additive can be a gel elastomeric silicone like the so-called elastomer blend, silicone polyethers, film formers like silicone acrylate copolymer dispersion or silicone polyamide compounds.

For example the additive can be water. The water can be either emulsified in components of the vehicle Y or the components of the vehicle Y can be emulsified in the water phase.

For example the additive can be a surfactant or an emulsifier to compatibilize the various components of the formulation. The surfactant or the emulsifier which may be employed includes silicone polyethers.

For example the additive can be a filler to adjust the rheology behaviour or the physical properties or to compatibilize the various components of the formulation. The term filler comprises any solid material. The fillers which may be employed include, but are not limited to siloxane resin, rosin type resins, acrylic polymer resins, polysaccharides, carbomer, alginate, zinc oxide, ground, precipitated, and colloidal calcium carbonates which can be untreated or treated with stearate or stearic acid; reinforcing silicas such as fumed silicas, precipitated silicas, and hydrophobed silicas; crushed quartz, ground quartz, alumina, aluminium hydroxide, titanium dioxide, diatomaceous earth, iron oxide, carbon black, and graphite.

For example, the filler can be silica to provide the following benefits when used in the following ranges: 0.1% to 5% compatibilizer and drying agent/5% to 15. % rheological modifier and texture enhancer/15% to 30% mechanical strength enhancer (all percentages by weight).

For example the additive can be a cosmetic excipient or a pharmaceutical excipient to provide complementary benefits. The complementary benefits which may be delivered include emolliency, partial or complete occlusivity, sensory benefits, colour. The cosmetic excipient or the pharmaceutical excipient which may be employed includes colorants, coloured indicators, other diluents, excipients employed in pharmacy, compounds intended to perform as pH buffers in controlling the environment immediately in and around the formulation, stabilizers, preservatives, surfactants for cellular formulations such as fluorinated silicones, absorbents for wounds, alginate, polysaccharides, gelatin, collagen, and materials that can decrease the friction on the surface of the cured film and/or change its gloss.

Some additional examples of the cosmetics, personal care, and cosmeceutical ingredients and pharmaceutical excipients that may be used herein may be found in the CTFA ingredient Database and the handbook of pharmaceutical excipients and can include, for example, absorbents, anticaking agents, antioxidants, antistatic agents, astringents, binders, buffering agents, bulking agents, chelating agents, colorants, cosmetic astringents, cosmetic biocides, deodorant agents, emollients, external analgesics, film formers, flavouring agents, fragrance ingredients, humectants, lytic agents, moisturizing agents, occlusivity enhancers, opacifying agents, oxidizing and reducing agents, penetration enhancers, pesticides, plasticizers, preservatives, skin bleaching agents, skin conditioning agents, skin protectants, slip modifiers, solubilising agents, solvents, sunscreen agents, surface modifiers, surfactants and emulsifying agents, suspending agents, thickening agents, viscosity controlling agents including increasing or decreasing agents, UV light absorbers.

Cosmetic, personal care and cosmeceutical ingredients, and pharmaceutical excipients which may be employed are selected, for example, from the following chemical classes: alcohols, fatty alcohols and polyols, aldehydes, alkanolamines, alkoxylated alcohols (e.g. polyethylene glygol derivatives of alcohols and fatty alcohols), alkoxylated amides, alkoxylated amines, alkoxylated carboxylic acids, amides including salts (e.g. ceramides), amines, amino acids including salts and alkyl substituted derivatives, esters, alkyl substituted and acyl derivatives, polyacrylic acids, acrylamide copolymers, adipic acid copolymers, alcohols, aminosilicones, biological polymers and derivatives, butylene copolymers, carbohydrates (e.g. polysaccharides, chitosan and derivatives), carboxylic acids, carbomers, esters, ethers and polymeric ethers (e.g. PEG derivatives, PPG derivatives), glyceryl esters and derivatives, halogen compounds, heterocyclic compounds including salts, hydrophilic colloids and derivatives including salts and gums (e.g. cellulose derivatives, gelatin, xanthan gum, natural gums), imidazolines, inorganic materials (clay, Ti02, ZnO), ketones (e.g. camphor), isethionates, lanolin and derivatives, organic salts, phenols including salts (e.g. parabens), phosphorus compounds (e.g. phosphate derivatives), polyacrylates and acrylate copolymers, protein and enzymes derivatives (e.g. collagen), synthetic polymers including salts, siloxanes and silanes, sorbitan derivatives, sterols, sulfonic acids and derivatives and waxes.

Some examples of anti acne agents are salicylic acid and sulfur. Some examples of antifungal agents are calcium undecylenate, undecylenic acid, zinc undecylenate, and povidone-iodine.

Some examples of antimicrobial agents are alcohol, benzalkonium chloride, benzethonium chloride, hydrogen peroxide, methylbenzethonium chloride, phenol, poloxamer 188, and povidone-iodine. Some examples of antioxidants are acetyl cysteine, arbutin, ascorbic acid, ascorbic acid polypeptide, ascorbyl dipalmitate, ascorbyl methylsilanol pectinate, ascorbyl palmitate, ascorbyl stearate, BHA, p-hydroxyanisole, BHT, t-butyl hydroquinone, caffeic acid, *camellia sinensis* oil, chitosan ascorbate, chitosan glycolate, chitosan salicylate, chlorogenic acids, cysteine, cysteine HCI, decyl mercaptomethylimidazole, erythorbic acid, diamylhydroquinone, di-t-butylhydroquinone, dicetyl thiodipropionate, dicyclopentadienelt-butylcresol copolymer, digalloyl trioleate, dilauryl thiodipropionate, dimyristyl thiodipropionate, dioleyl tocopheryl methylsilanol, isoquercitrin, diosmine, disodium ascorbyl sulfate, disodium rutinyl disulfate, distearyl thiodipropionate, ditridecyl thiodipropionate, dodecyl gallate, ethyl ferulate, ferulic acid, hydroquinone, hydroxylamine HCl, hydroxylamine sulfate, lsooctyl thioglycolate, kojic acid, madecassicoside, magnesium ascorbate, magnesium ascorbyl phosphate, melatonin, methoxy-PEG-7 rutinyl succinate, methylene di-t-butylcresol, methylsilanol ascorbate, Nordihydroguaiaretic acid, octyl gallate, phenylthioglycolic acid, phloroglucinol, potassium ascorbyl tocopheryl phosphate, thiodiglycolamide, potassium sulfite, propyl gallate, rosmarinic acid, rutin, sodium ascorbate, sodium ascorbyl/cholesteryl phosphate, sodium bisulfite, sodium erythorbate, sodium metabisulfide, sodium sulfite, sodium thioglycolate, sorbityl furfural, tea tree (melaleuca aftemifolia) oil, tocopheryl acetate, tetrahexyldecyl ascorbate, tetrahydrodiferuloylmethane, tocopheryl linoleateioleate, thiodiglycol, tocopheryl succinate, thiodiglycolic acid, thioglycolic acid, thiolactic acid, thiosalicylic acid, thiotaurine, retinol, tocophereth-5, tocophereth-10, tocophereth-12, tocophereth-18, tocophereth-50, tocopherol, tocophersolan, tocopheryl linoleate, tocopheryl nicotinate, tocoquinone, o-tolyl biguanide, tris(nonylphenyl) phosphite, ubiquinone, and zinc dibutyldithiocarbamate. Some examples of cosmetic biocides are aluminium phenolsulfonate, ammonium phenolsulfonate, bakuchiol, benzalkonium bromide, benzalkonium cetyl phosphate, benzalkonium chloride, benzalkonium saccharinate, benzethonium chloride, potassium phenoxide, benzoxiquine, benzoxonium chloride, bispyrithione, boric acid, bromochlorophene, camphor benzalkonium methosulfate, captan, cetalkoniurn chloride, cetearalkonium bromide, cetethyldimonium bromide, cetrimonium bromide, cetrimonium chloride, cetrimonium methosulfate, cetrimonium saccharinate, cetrimonium tosylate, cetylpyridinium chloride, chloramine t, chlorhexidine, chlorhexidine diacetate, chlorhexidine digluconate, chlorhexidine dihydrochloride, p-chloro-m-cresol, chlorophene, p-chlorophenol, chlorothyrnol, chloroxylenol, chlorphenesin, ciclopirox olamine, climbazole, cloflucarban, clotrimazole, coal tar, colloidal sulfur, o-cytnen-5-01, dequalinium acetate, dequalinium chloride, dibromopropamidine diisethionate, dichlorobenzyl alcohol, dichlorophene, dichlorophenyl imidazoldioxolan, dichloro-m-xylenol, diiodomethyltolylsulfone, dimethylol ethylene thiourea, diphenylmethyl piperazinylbenzimidazole, domiphen bromide, 7-ethylbicyclooxazolidine, fluorosalan, formaldehyde, glutaral, hexachlorophene, hexamidine, hexamidine diisethionate, hexamidine diparaben, hexamidine paraben, hexetidine, hydrogen peroxide, hydroxymethyl dioxoazabicyclooctane, ichthammol, isopropyl cresol, lapyrium chloride, lauralkonium bromide, lauralkonium chloride, laurtrimonium bromide, laurtrimonium chloride, laurtrimonium trichlorophenoxide, lauryl isoquinolinium bromide, lauryl isoquinolinium saccharinate, laurylpyridinium chloride, mercuric oxide, methenamine, methenammonium chloride, methylbenzethonium chloride, myristalkonium chloride, myristalkonium saccharinate, myrtrimonium bromide, nonoxynol-9 iodine, nonoxynol-12 iodine, olealkonium chloride, oxyquinoline, oxyquinoline benzoate, oxyquinoline sulfate, PEG-2 coco-benzonium chloride, PEG-10 coco-benzonium chloride, PEG-6 undecylenate, PEG-8 undecylenate, phenol, o-phenylphenol, phenyl salicylate, piroctone olamine, sulfosuccinylundecylenate, potassium o-phenylphenate, potassium salicylate, potassium troclosene, propionic acid, pvp-iodine, quaternium-8, quaternium-14, quaternium-24, sodium phenolsulfonate, sodium phenoxide, sodium o-phenylphenate, sodium shale oil sulfonate, sodium usnate, thiabendazole, 2,2'-thiobis(4-chlorophenol), thiram, triacetin, triclocarban, triclosan, trioctyldodecyl borate, undecylenamidopropylamine oxide, undecyleneth-6, undecylenic acid, zinc acetate, zinc aspartate, zinc borate, zinc chloride, zinc citrate, zinc cysteinate, zinc dibutyldithiocarbamate, zinc gluconate, zinc glutamate, zinc lactate, zinc phenolsulfonate, zinc pyrithione, zinc sulfate, and zinc undecylenate. Some examples of external analgesics are benzyl alcohol, *capsicum* oleoresin (*capsicum Frutescens oleoresin*), methyl salicylate, camphor, phenol, capsaicin, juniper tar (juniperus oxycedrus tar), phenolate sodium (sodium phenoxide), *capsicum (capsicum frutescens)*, menthol, resorcinol, methyl nicotinate, and turpentine oil (turpentine). Some examples of oxidizing agents are ammonium persulfate, calcium peroxide, hydrogen peroxide, magnesium peroxide, melamine peroxide, potassium bromate, potassium caroate, potassium chlorate, potassium persulfate, sodium bromate, sodium carbonate peroxide, sodium chlorate, sodium iodate, sodium perborate, sodium persulfate, strontium dioxide, strontium peroxide, urea peroxide, and zinc peroxide. Some examples of reducing agents are ammonium bisulfite, ammonium sulfite, ammonium thioglycolate, ammonium thiolactate, cystemaine hci, cystein, cysteine HCl, ethanolamine thioglycolate, glutathione, glyceryl thioglycolate, glyceryl thioproprionate, hydroquinone, p-hydroxyanisole, isooctyl thioglycolate, magnesium thioglycolate, mercaptopropionic acid, potassium metabisulfite, potassium sulfite, potassium thioglycolate, sodium bisulfite, sodium hydrosulfite, sodium hydroxymethane sulfonate, sodium metabisulfite, sodium sulfite, sodium thioglycolate, strontium thioglycolate, superoxide dismutase, thioglycerin, thioglycolic acid, thiolactic acid, thiosalicylic acid, and zinc formaldehyde sulfoxylate. An example of a skin bleaching agent is hydroquinone. Some examples of skin protectants are allantoin, aluminium acetate, aluminium hydroxide, aluminium sulfate, calamine, cocoa butter, cod liver oil, colloidal oatmeal, dimethicone, glycerin, kaolin, lanolin, mineral oil, petrolatum, shark liver oil, sodium bicarbonate, talc, witch hazel, zinc acetate, zinc carbonate, and zinc oxide. Some examples of sunscreen agents are aminobenzoic acid, cinoxate, diethanolamine methoxycinnamate, digalloyl trioleate, dioxybenzone, ethyl 4-[bis(hydroxypropyl)] aminobenzoate, glyceryl aminobenzoate, homosalate, lawsone with dihydroxyacetone, menthyl anthranilate, octocrylene, octyl methoxycinnamate, octyl salicylate, oxybenzone, padimate 0, phenylbenzimidazole sulfonic acid, red petrolatum, sulisobenzone, titanium dioxide, and trolamine salicylate. Some examples of UV light absorbing agents are acetaminosalol, allatoin PABA, benzalphthalide, benzophenone, benzophenone 1-12, 3-benzylidene camphor, benzylidenecamphor hydrolyzed collagen sulfonamide, benzylidene camphor sulfonic acid, benzyl salicylate, bornelone, bumetriozole, butyl methoxydibenzoylmethane, butyl PABA, ceridsilica, ceridsilica talc, cinoxate, dea-methoxycinnamate, dibenzoxazol naphthalene, di-t-butyl hydroxybenzylidene camphor, digalloyl trioleate, diisopropyl methyl cinnamate, dimethyl PABA ethyl cetearyldimonium tosylate, dioctyl butamido triazone, diphenyl carbomethoxy acetoxy naphthopyran, disodium bisethylphenyl tiamminotriazine stilbenedisulfonate, disodium distyrylbiphenyl triaminotriazine stilbenedisulfonate, disodium distyrylbiphenyl disulfonate, drometrizole, drometrizole trisiloxane, ethyl dihydroxypropyl PABA, ethyl diisopropylcinnamate, ethyl methoxycinnamate, ethyl PABA, ethyl urocanate, etrocrylene ferulic acid, glyceryl octanoate dimethoxycinnamate, glyceryl PABA, glycol salicylate, homosalate, isoamyl p-methoxycinnamate, isopropylbenzyl salicylate, isopropyl dibenzolylmethane, isopropyl methoxycinnamate, menthyl anthranilate, menthyl salicylate, 6-methylbenzylidene, camphor, octocrylene, octrizole, octyl dimethyl PABA, octyl methoxycinnamate, octyl salicylate, octyl triazone, PABA, PEG-25 PABA, pentyl dimethyl PABA, phenylbenzimidazole sulfonic acid, polyacrylamidomethyl benzylidene camphor, potassium methoxycinnamate, potassium phenylbenzimidazole sulfonate, red petrolatum, sodium phenylbenzimidazole sulfonate, sodium urocanate, tea-phenylbenzimidazole sulfonate, tea-salicylate, terephthalylidene dicamphor sulfonic acid, titanium dioxide, tripaba panthenol, urocanic acid, and va~crotonates/methacryloxybenzophenone-1 copolymer.

For example the additive can be a hydrophilic material that can provide bioadhesive, modulating water absorption, swellability or controlled release properties as set forth in EP 465,744. Such additives include, but are not limited to carbomer (polyacrylic acid), polysaccharides, sugars and derivatives, polyvinyl alcohol, glycerin, polyether glycols.

Since mixing of the component materials in vehicle Y causes curing at room temperature, these component materials can be stored in a plurality of containers prior to use to inhibit curing. For instance, one container could contain the catalyst and a second could contain the polysiloxanes. Alternatively, the catalyst could be mixed with one of the siloxanes in one container and the other siloxane could be in a second container. Each of the additional components in the formulation is put in the container which is most desirable depending on factors such as stability, viscosity, and interactions.

Another alternative to prevent the vehicle Y to cure prior its use comprises temporarily inhibiting the hydrosilylation catalyst (d) by encapsulating the hydrosilylation catalyst (d) or by adding transient inhibitors.

According to the method of the invention, the spreadable formulation comprising the vehicle Y, the active agent X and any other optional components are delivered and spread onto the desired site in a manner which causes mixing of the component materials. The formulation cures after being applied and results in a sustained release composition. Preferably, the spreadable formulations are spread onto a biological surface including, but not limited to animal bodies (e.g., human or other animal).

The delivery herein is performed by conventional techniques known in the art. For instance the delivery systems include, but not limited to can, tube, sachet, syringe, stick, pencil, brush, sponge, wet stamp and roll-on as known in the art. These delivery devices can comprise one or more than one chamber according to the need to separate the components of the formulation.

Whichever of the above means of delivery is chosen, the formulation components are delivered and spread to the desired site. Mixing of the formulation components can occur either in the delivery packaging, during the delivery or during the spreading onto the desired site.

For instance, a mixing chamber can be built into the delivery packaging such that as the formulation components are drawn or forced out of their separate containers they are mixed prior to being delivered.

In an embodiment the formulation components are separated by fragile walls which can easily be broken to allow the formulation components for getting in contact together. The mixing then occurs by hand kneading or with a mixing tool as known in the art.

In another embodiment the formulation components are forced into a mixing device such as a static mixer and then delivered to the site.

In still another embodiment, the formulation components can be delivered sequentially and then be mixed on the desired site.

In case of one part system in which the catalyst is encapsulated or temporarily inhibited, an external factor triggers the cure by releasing the catalyst. For instance, such factors can be, but are not limited to elevated temperature (e.g. body or skin temperature, hair dryer), shearing effect or evaporation of certain formulation additives (e.g. diluent).

The present invention offers numerous advantages over the prior art. The method described herein allows for the simple dispensing of the sustained release composition to various sites of application including the face and the areas which cannot be treated with conventional adhesive patches or sprayed compositions. As such, a skilled practitioner is not required for application. Likewise, the formulation chosen enables sustained release compositions to be formed by simple and easily sustained methods in situ. Moreover, the sustained release composition can be formed into a wide variety of shapes and have selected combinations of properties (e.g. bioadhesion, release rate and release profile). Preferably, the invention provides silicone containing compositions able to form adhesive films on substrates.

Similarly, the formulations and the sustained release compositions described herein can easily comprise the attributes of cosmetic products in term of ease of use and aesthetic and still deliver the benefits of pharmaceutical therapeutic delivery systems with active sustained release property.

The formulation and sustained release composition herein are generally acceptable on many biological membranes. The sustained release composition may be formed on intact or damaged skin or in a natural or artificial cavity of the body. The cavity may be, for example, the ocular, oral (mouth), nasal, aural, vaginal or rectal cavity or a cavity formed, for example, in a tooth or an open wound.

The compositions may be formulated to give a moderate to rapid release of active agent X. The drug delivery profile of compositions according to the invention may be predetermined by appropriate selection of the types and proportions of component materials and ingredients used.

It is a further advantage of the present invention that the controlled release compositions can have many physical properties from gel to elastomer and foam so that they are able to withstand many of the pressures exerted during normal activities of a patient.

EXAMPLES

To clarify the invention, Examples in the form of/consisting of Formulations and films produced thereof follow which illustrate the methods of the invention. Unless indicated, all parts are by weight and all viscosities are at 25° C.

Formulations may be prepared either in a 1-part or a 2-part process, as will be indicated in the procedure description of the respective tables. Preparing the formulations via a 1-part or a 2-part process is not expected to significantly impact the performance parameters observed.

The films generated are evaluated following assessment procedures here outlined:
- Adhesion as an evaluation of the adhesion to a contrast card substrate (Leneta card WP-1): evaluate how difficult it is to remove a piece of cured film off the substrate using a spatula (scale: from 1=easy to remove to 3=difficult to remove).
- Residual tack as the level of adhesion to clean finger (scale: from 1=non tacky to 3=tacky)
- Tack free time as the time needed for the film to be non-tacky or stabilize at its residual tack level (minutes, with To=coating)
- Drag as an evaluation of the resistance to having a finger slide on the film surface (scale: from 1=slippery to 3=draggy)

The formulation components X used to illustrate the invention are listed in Table 1.

TABLE 1

| Formulation component | Description | Viscosity | vinyl (mol/g) | H as SiH (mol/g) |
|---|---|---|---|---|
| (a) 1 | Vinyl-functional MQ resin | NA | 1.10E−03 | NA |
| (a) 2 | Vinyl-terminated polydimethylsiloxane | 9,000 mPa·s | 5.00E−05 | NA* |
| (a) 3 | Vinyl-terminated polydimethylsiloxane | 60,000 mPa·s | 3.00E−05 | NA |
| (a) 4 | Vinyl-terminated polydimethylsiloxane | 4.5 mm2/s | 2.60E−03 | NA |
| (b) 1 | Methylhydrogen cyclosiloxane | 1 mm2/s | NA | 1.70E−02 |
| (b) 2 | Methylhydrogen siloxane | 30 mm2/s | NA | 1.50E−02 |
| (b) 3 | Dimethyl, methylhydrogen siloxane | 5 mm2/s | NA | 7.80E−03 |
| (c) | Dimethylhydrogen-terminated polydimethylsiloxane | 10 mm2/s | NA | 2.00E−03 |
| (d) | Platinum complex | 400 mm2/s | 8.40E−04 | NA |

*NA = not applicable
1.8E−03 = 1.8·10$^{-3}$
Measure of cinematic viscosity in mm2/s
Measure of dynamic viscosity in mPa·s The formulations F1 to F3 used to illustrate the invention and the Comparative example CF4 are described in Table 2. Films produced from formulations F1 to F3 containing vinyl-functional MQ resins exhibited higher adhesion versus film produced from formulation CF4 which does not contain vinyl-functional MQ resins. Films produced from formulations F1 and F2 with $RVi_R$>0.90 exhibited higher adhesion versus film produced from formulation F3 with $RVi_R$<0.90. RHV is the ratio of the number of SiH moles in the formulation with respect to the number of vinyl moles in the formulation, prior to reaction.

$RVi_R$ is the ratio of the number of vinyl moles in the vinyl resin with respect to the total number of vinyl moles in the formulation, prior to reaction.

TABLE 2

| | Formulation | | | |
|---|---|---|---|---|
| Component | F1 (wt. %) | F2 (wt. %) | F3 (wt. %) | CF4 (wt. %) |
| (a) 1 | 45.0 | 52.4 | 36.7 | 0.0 |
| (a) 2 | 22.5 | 0.0 | 0.0 | 94.1 |
| (a) 3 | 0.0 | 0.0 | 9.7 | 0.0 |
| (a) 4 | 0.0 | 0.0 | 28.2 | 0.0 |
| (b) 1 | 9.3 | 0.0 | 0.0 | 0.0 |
| (b) 2 | 0.0 | 0.0 | 24.6 | 0.0 |
| (b) 3 | 0.0 | 0.0 | 0.0 | 1.2 |
| (c) | 0.0 | 23.5 | 0.0 | 3.5 |
| (d) | 1.0 | 1.1 | 0.9 | 1.2 |
| Diluent | 22.2 | 23.2 | 0.0 | 0.0 |
| RHV | 3.14 | 0.75 | 3.27 | 2.74 |
| $RVi_R$ | 0.96 | 0.98 | 0.34 | 0 |
| Adhesion | 3 | 3 | 2 | 2 |

Procedure to prepare formulations F1 to F3 and $CF_4$:
1. Weigh all ingredients of Part A and homogenise overnight on a rotating mixer
2. Weigh all ingredients of Part B and homogenise overnight on a rotating mixer 3. Mix Part A & B in a 1:1 ratio using Dental mixer for 10 seconds
4. Coat immediately on substrate (100 microns)
5. Let dry 1 minute at room temperature
6. Put in oven at 32° C.

In order to identify the optimal formulation, several variations were prepared varying parameters such as RHV or $RVi_R$. The films produced from these were assessed using the following critical performance responses: tack free time, residual tack, adhesion and drag. The corresponding targets are, respectively: low tack free time, low residual tack, high adhesion and low drag.

Variations of formulation F1, F1a to F1f were prepared and are described in Table 3. Variation was brought to the RHV, impacting parameters such as tack free time, adhesion and drag. Upon increase of RHV, tack free time and drag were found to decrease while adhesion was found to exhibit an optimum. The optimized compromise between adhesion, tack free time and drag was found for F1 and F1d.

TABLE 3

| Component | F1 (wt. %) | F1a (wt. %) | F1b (wt. %) | F1c (wt. %) | F1d (wt. %) | F1e (wt. %) | F1f (wt. %) |
| --- | --- | --- | --- | --- | --- | --- | --- |
| (a) 1 | 45.0 | 48.0 | 47.0 | 46.0 | 45.0 | 44.0 | 43.0 |
| (a) 2 | 22.5 | 25.0 | 24.0 | 23.0 | 22.0 | 21.0 | 20.0 |
| (a) 3 | 0.0 | 0.0 | 0.0 | 0.0 | 0.0 | 0.0 | 0.0 |
| (a) 4 | 0.0 | 0.0 | 0.0 | 0.0 | 0.0 | 0.0 | 0.0 |
| (b) 1 | 9.3 | 3.0 | 5.0 | 7.0 | 9.0 | 11.0 | 13.0 |
| (b) 2 | 0.0 | 0.0 | 0.0 | 0.0 | 0.0 | 0.0 | 0.0 |
| (b) 3 | 0.0 | 0.0 | 0.0 | 0.0 | 0.0 | 0.0 | 0.0 |
| (c) | 0.0 | 0.0 | 0.0 | 0.0 | 0.0 | 0.0 | 0.0 |
| (d) | 1.0 | 1.0 | 1.0 | 1.0 | 1.0 | 1.0 | 1.0 |
| Diluent | 22.2 | 23.0 | 23.0 | 23.0 | 23.0 | 23.0 | 23.0 |
| RHV | 3.14 | 0.95 | 1.61 | 2.30 | 3.03 | 3.79 | 4.58 |
| RHVi | 0.96 | 0.96 | 0.96 | 0.96 | 0.96 | 0.96 | 0.96 |
| Tack free time | 5'10" | 14' | 8' | 7'40" | 6'20" | 4'30" | 4' |
| Residual tack | 1 | 1 | 1 | 1 | 1 | 1 | 1 |
| Adhesion | 3 | 1 | 1 | 2 | 3 | 1 | 1 |
| Drag | 1 | 2 | 2 | 1 | 1 | 1 | 1 |

Procedure to prepare formulations F1a to F1f:
1. Weigh all ingredients but catalyst and homogenize overnight on a rotating mixer
2. Weigh catalyst and mix using Dental mixer for 10 seconds
3. Coat immediately on substrate (100 microns)
4. Let dry 1 minute at room temperature
5. Put in oven at 32° C.

Variations of formulation F1, F1g to F1j, were prepared and are described in Table 4. Upon increase of the ratio polysiloxane resin (a) to telechelic linear siloxane (c), tack free time and adhesion were found to decrease while drag was found to increase. The optimized compromise between adhesion, tack free time and drag was found for F1 and F1g.

TABLE 4

| Component | F1 (wt. %) | F1g (wt. %) | F1h (wt. %) | F1i (wt. %) | F1j (wt. %) |
| --- | --- | --- | --- | --- | --- |
| (a) 1 | 44.97 | 45 | 48 | 53 | 60 |
| (a) 2 | 22.48 | 21.5 | 18 | 10 | 0 |
| (a) 3 | 0 | 0 | 0 | 0 | 0 |
| (a) 4 | 0 | 0 | 0 | 0 | 0 |
| (b) 1 | 9.33 | 9.5 | 10 | 11 | 12 |
| (b) 2 | 0 | 0 | 0 | 0 | 0 |
| (b) 3 | 0 | 0 | 0 | 0 | 0 |
| (c) | 0 | 0 | 0 | 0 | 0 |
| (d) | 1 | 1 | 1 | 1 | 1 |
| Diluent | 22.22 | 23 | 23 | 25 | 27 |
| RHV | 3.14 | 3.20 | 3.17 | 3.19 | 3.11 |
| RHVi | 0.96 | 0.96 | 0.97 | 0.98 | 0.99 |
| Tack free time | 5'10" | 7' | 4' | 3' | 2'30" |
| Residual tack | 1 | 1 | 1 | 1 | 1 |
| Adhesion | 3 | 3 | 3 | 3 | 3 |
| Drag | 1 | 1 | 1 | 2 | N/A |

Procedure to prepare formulations F1g to F1j:
1. Weigh all ingredients but catalyst and homogenize overnight on a rotating mixer
2. Weigh catalyst and mix using Dental mixer for 10 seconds
3. Coat immediately on substrate (100 microns)
4. Let dry 1 minute at room temperature
5. Put in oven at 32° C.

Variations of formulation F2 with regard to RHV, F2a to F2d, were prepared and are described in Table 5. The variation to RHV impacts parameters such as tack free time, residual tack, adhesion and drag. Upon increase of RHV, tack free time and adhesion were found to decrease while residual tack and drag were found to increase. The optimized compromise between adhesion, residual tack, tack free time and drag was found for F2 and F2a.

TABLE 5

| Component | F2 (wt. %) | F2a (wt. %) | F2b (wt. %) | F2c (wt. %) | F2d (wt. %) |
| --- | --- | --- | --- | --- | --- |
| (a) 1 | 52.4 | 57.0 | 47.0 | 43.0 | 39.0 |
| (a) 2 | 0.0 | 0.0 | 0.0 | 0.0 | 0.0 |
| (a) 3 | 0.0 | 0.0 | 0.0 | 0.0 | 0.0 |
| (a) 4 | 0.0 | 0.0 | 0.0 | 0.0 | 0.0 |
| (b) 1 | 0.0 | 0.0 | 0.0 | 0.0 | 0.0 |
| (b) 2 | 0.0 | 0.0 | 0.0 | 0.0 | 0.0 |
| (b) 3 | 0.0 | 0.0 | 0.0 | 0.0 | 0.0 |
| (c) | 23.5 | 18.0 | 28.0 | 32.0 | 36.0 |
| (d) | 1.1 | 1.0 | 1.0 | 1.0 | 1.0 |
| Diluent | 23.1 | 24.0 | 24.0 | 24.0 | 24.0 |
| RHV | 0.7 | 0.5 | 1.0 | 1.2 | 1.5 |
| RHVi | 0.98 | 0.98 | 0.98 | 0.98 | 0.98 |
| Tack free time | 6'19" | 5' | 5' | 2'50 | 2'40" |
| Residual tack | 1 | 1 | 1 | 2 | 3 |
| Adhesion | 3 | 3 | 2 | 1 | 1 |
| Drag | 1 | 1 | 1 | 2 | 3 |

Procedure to prepare formulations F2a to F2d:
1. Weigh all ingredients but catalyst and homogenize overnight on a rotating mixer
2. Weigh catalyst and mix using Dental mixer for 10 seconds
3. Coat immediately on substrate (100 microns)
4. Let dry 1 minute at room temperature
5. Put in oven at 32° C.

Compatibility of parts A and parts B of formulations F1 and F2 with lidocaine (active molecule: 2-(diethylamino)-N-(2,6-dimethylphenyl)acetamide; used as local anaesthetic, anti arrhythmic) was evaluated visually after mixing lidocaine with each of the 2 parts composing the formulations, leading to compositions F1lidA, F1lidB, F2lidA and F2lidB described in Table 6. Visual observations confirm the different parts A and B of each formulation F1 and F2 are compatible with lidocaine: F1lidA and F1lidB were homogeneous but opalescent while F2lidA and F2lidB were homogeneous and clear.

TABLE 6

| Component | Formulation | | | |
|---|---|---|---|---|
| | F1lidA Part A | F1lidB Part B | F2lidA Part A | F2lidB Part B |
| (a) 1 | 42.7 | 42.7 | 49.7 | 49.7 |
| (a) 2 | 21.4 | 21.4 | 0.0 | 0.0 |
| (a) 3 | 0.0 | 0.0 | 0.0 | 0.0 |
| (a) 4 | 0.0 | 0.0 | 0.0 | 0.0 |
| (b) 1 | 0.0 | 17.7 | 0.0 | 0.0 |
| (b) 2 | 0.0 | 0.0 | 0.0 | 0.0 |
| (b) 3 | 0.0 | 0.0 | 0.0 | 0.0 |
| (c) | 0.0 | 0.0 | 0.0 | 44.6 |
| (d) | 1.9 | 0.0 | 2.0 | 0.0 |
| Diluent | 29.0 | 13.2 | 43.3 | 0.7 |
| Isopropyl Myristate | 4.00 | 4.00 | 4.00 | 4.00 |
| Lidocaine | 1.00 | 1.00 | 1.00 | 1.00 |

Procedure to prepare compositions F1lidA, F1lidB, F2lidA and F2lidB:
1. Prepare a premix dissolving the lidocaine in isopropyl myristate
2. Add half of the premix to the rest of the ingredients of Part A and homogenize using a vortex mixer
3. Add the other half of the premix to the rest of the ingredients of Part B and homogenize using a vortex mixer Formulations F1lid and F2lid, described in Table 7, were further prepared using the above compositions F1lidA, F1lidB, F2lidA and F2lidB, by mixing the respective parts A and B in a 1/1 ratio (by weight), to verify the impact of the presence of lidocaine (known hydrosilylation reaction inhibitor) on the cross-linking reaction of the different components. In terms of reactivity, some inhibition of the hydrosilylation reaction was observed, especially in the case of F2lid. As a result, reticulation of the systems was delayed but nevertheless took place upon placing the F1lid and F2lid formulations in an oven at 32° C. and 45° C., respectively.

Following production of the formulations, films were formed and release studies of lidocaine out of the films were performed. F1lid and F2lid were then placed into a receptor fluid and the lidocaine concentration in the receptor fluid was monitored. Lidocaine was proven to be released from both formulations F1lid and F2lid.

TABLE 7

| Component | Formulation | |
|---|---|---|
| | F1lid (wt. %) | F2lid (wt. %) |
| (a) 1 | 42.7 | 49.7 |
| (a) 2 | 21.4 | 0.0 |
| (a) 3 | 0.0 | 0.0 |
| (a) 4 | 0.0 | 0.0 |
| (b) 1 | 8.9 | 0.0 |
| (b) 2 | 0.0 | 0.0 |
| (b) 3 | 0.0 | 0.0 |
| (c) | 0.0 | 22.3 |
| (d) | 1.0 | 1.0 |
| Diluent | 21.1 | 21.9 |
| Isopropyl Myristate | 4.0 | 4.0 |
| Lidocaine | 1.0 | 1.0 |

Procedure to prepare formulations F1lid and F2lid using compositions F1lidA, F1lidB, F2lidA and F2lidB, followed by procedure to prepare film and perform release test on film:

1. Mix Parts A & B in a 1:1 ratio using a spatula for 15 seconds
2. Weigh about 2g of the formulation in a plastic weighting cell and record exact weight
3. Allow reaction to complete: let stand ~15 nm s at 21° C. for formulations F1 and F2, 1 hrs at 21° C.+1 h at 32° C.+20 min at 45° C. for F2lid, 1 h at 21° C.+1 h at 32° C. for F1lid
4. Immerge weighing cell+cured formulation in 50 g of a 25:75 EtOH:water (by weight)
5. Put vial on rotating mixer/homogenizer
6. Take a 1 ml sample after 1 h, 2 h, 4 h and 24 h and record exact weight of sample taken
7. Determine lidocaine concentration in samples analytically (HPLC)

The invention claimed is:

1. A method of making a controlled release composition for medical or pharmaceutical use comprising preparing a spreadable formulation containing an active agent X and a vehicle Y, said vehicle Y comprising a curable silicone composition comprising components (a), (d) and at least one of (b) or (c):
   a) a polyorganosiloxane resin, composed of M and Q units having at least 3 alkenyl groups per molecule, herein after called "SiVi" groups,
   b) a polyorganosiloxane compound having at least 2 Si-bonded hydrogen groups on the polysiloxane chain, hereinafter called "SiH" groups,
   c) a telechelic polyorganosiloxane compound having terminal Si—H groups, and
   d) a hydrosilylation catalyst for the reaction of SiH groups with SiVi groups,
   e) in the presence of a liquid diluent in an amount of from 0 to maximum 40% by weight of the composition
   wherein the components react together by hydrosilylation at a temperature below 40° C. when they are brought into contact on a substrate and cure to form a continuous film on the substrate.

2. A method according to claim 1, wherein the SiH groups containing compound is mainly formed of telechelic polyorganosiloxane compound having terminal Si—H groups.

3. A method according to claim 1, wherein the liquid diluent is present in an amount of less than 25% by weight of the composition.

4. A method according to claim 1, wherein the MQ resin is present in an amount comprised between 30% and 60% by weight of the composition.

5. A method according to claim 1, wherein the SiH groups containing components are present in an amount comprised between 5% and 30% by weight of the composition.

6. A method according to claim 1, wherein the substrate is a biological surface.

7. A method according to claim 1, wherein the components react together by hydrosilylation at a temperature at or below 32° C. when they are brought into contact on a substrate and cure to form a continuous film on the substrate in less than 10 minutes.

8. A method according to claim 1, wherein the components react together by hydrosilylation at a temperature of from 15-25° C. when they are brought into contact on a substrate and cure to form a continuous film on the substrate in less than 10 minutes.

9. A method according to claim 1, wherein active agent X is a therapeutic active agent selected from acne agents, antibiotics, antiseptics, antifungals, antibacterials, antimicrobials, biocides, anti-inflammatory agents, astringents, hormones, anticancer agents, smoking cessation compositions, cardiovascular drugs, histamine blockers, bronchodilators, analgesics, antiarrythmics, antihistamines, alpha blockers, beta blockers, ACE inhibitors, diuretics, antiaggregants, sedatives, tranquillizers, anticonvulsants, anticoagulant agents, vitamins, antiaging agents, agents for treating gastric and duodenal ulcers, anticellulites, proteolytic enzymes, healing factors, cell growth nutrients, peptides, penicillins, cephalosporins, tetracyclines, macrolides, epinephrines, amphetamines, aspirin, acetaminophen, barbiturates, catecholamines, benzodiazepine, thiopental, codeine, morphine, procaine, lidocaine, benzocaine, sulphonamides, ticonazole, perbuterol, furosamide, prazosin, prostaglandins, salbutamol, indomethicane, diclofenac, glafenine, dipyridamole, theophylline, retinol, or cosmetics.

10. A method according to claim 1, wherein the components react together in situ by hydrosilylation at a temperature below 40° C. when they are brought into contact on a substrate and cure to form a continuous film on the substrate.

11. A controlled release composition for medical or pharmaceutical use prepared according to claim 1.

12. A method of manufacturing a substrate containing a continuous film comprising:
   reacting together by hydrosilylation at a temperature below 40° C. components (a), (d) and at least one of (b) or (c) components comprising:
   (a) a polyorganosiloxane resin, composed of M and Q units having at least 3 alkenyl groups per molecule, herein after called "SiVi" groups,
   b) a polyorganosiloxane compound having at least 2 Si-bonded hydrogen groups on the polysiloxane chain, hereinafter called "SiH" groups,
   c) a telechelic polyorganosiloxane compound having terminal Si—H groups, and
   d) a hydrosilylation catalyst for the reaction of SiH groups with SiVi groups,
   e) in the presence of a liquid diluent in an amount of from 0 to maximum 40% by weight of the composition;
   on a substrate to form a continuous film on the substrate.

13. A method according to claim 12, wherein the temperature is at or below 32° C. and wherein the reacting of the components on a substrate to form a continuous film on the substrate occurs in less than 10 minutes.

14. A method according to claim 12, wherein the temperature is from 15-25° C. and wherein the reacting of the components on a substrate to form a continuous film on the substrate occurs in less than 10 minutes.

15. A method according to claim 12, wherein an additional component is present, wherein the additional component is a therapeutic active agent selected from acne agents, antibiotics, antiseptics, antifungals, antibacterials, antimicrobials, biocides, anti-inflammatory agents, astringents, hormones, anticancer agents, smoking cessation compositions, cardiovascular drugs, histamine blockers, bronchodilators, analgesics, antiarrythmics, antihistamines, alpha blockers, beta blockers, ACE inhibitors, diuretics, antiaggregants, sedatives, tranquillizers, anticonvulsants, anticoagulant agents, vitamins, antiaging agents, agents for treating gastric and duodenal ulcers, anticellulites, proteolytic enzymes, healing factors, cell growth nutrients, peptides, penicillins, cephalosporins, tetracyclines, macrolides, epinephrines, amphetamines, aspirin, acetaminophen, barbiturates, catecholamines, benzodiazepine, thiopental, codeine, morphine, procaine, lidocaine, benzocaine, sulphonamides, ticonazole, perbuterol, furosamide, prazosin, prostaglandins, salbutamol, indomethicane, diclofenac, glafenine, dipyridamole, theophylline, retinol, or cosmetics.

16. A method according to claim 12, wherein the method further comprises reacting together in situ by hydrosilylation at a temperature below 40° C. components (a), (d) and at least one of (b) or (c).

17. A substrate prepared according to the method of claim 12.

18. A substrate prepared according to claim 12, wherein the substrate is a biological surface.

* * * * *